United States Patent
Stuart

Patent Number: 5,844,399
Date of Patent: Dec. 1, 1998

[54] BATTERY CHARGER CONTROL SYSTEM

[75] Inventor: Thomas A. Stuart, Maumee, Ohio

[73] Assignee: The University of Toledo, Toledo, Ohio

[21] Appl. No.: 687,810

[22] Filed: Jul. 26, 1996

[51] Int. Cl.⁶ .............................. H02J 7/04; H02J 7/00; H01M 10/44; G05F 1/40

[52] U.S. Cl. ............................ 320/31; 307/64; 323/271; 323/222; 323/282

[58] Field of Search .................................. 320/30, 31, 35, 320/39, 50, 48, 2, 27, 28, 29, 9, 10, 11; 307/64; 323/222, 224, 282–287, 271–272, 907

[56] References Cited

U.S. PATENT DOCUMENTS

| | | | |
|---|---|---|---|
| 4,024,448 | 5/1977 | Christianson et al. | 320/23 |
| 4,536,696 | 8/1985 | Ray | 320/39 X |
| 4,578,630 | 3/1986 | Grosch | 323/271 |
| 4,629,965 | 12/1986 | Fallon et al. | 320/39 |
| 4,695,784 | 9/1987 | Reynolds | 320/32 |
| 4,716,353 | 12/1987 | Engelmann | 320/21 |
| 4,742,290 | 5/1988 | Sutphin et al. | 320/21 |
| 4,964,029 | 10/1990 | Severinsky et al. | 323/271 X |
| 5,029,266 | 7/1991 | Randolph | 320/31 |
| 5,043,650 | 8/1991 | Bhagwat et al. | 320/39 |
| 5,049,804 | 9/1991 | Hutchings | 320/20 |
| 5,097,196 | 3/1992 | Schoneman | 323/222 |
| 5,150,032 | 9/1992 | Ho | 320/14 |
| 5,168,205 | 12/1992 | Kan et al. | 320/22 |
| 5,192,905 | 3/1993 | Karlin et al. | 320/23 |
| 5,198,743 | 3/1993 | McClure et al. | 320/31 |
| 5,202,617 | 4/1993 | Nor | 320/2 |
| 5,204,611 | 4/1993 | Nor et al. | 320/21 |
| 5,254,932 | 10/1993 | Bittar et al. | 320/23 |
| 5,359,280 | 10/1994 | Canter et al. | 323/282 |
| 5,371,456 | 12/1994 | Brainard | 320/31 |
| 5,461,263 | 10/1995 | Helfrich | 307/64 |
| 5,465,011 | 11/1995 | Miller et al. | 307/64 |

*Primary Examiner*—Peter S. Wong
*Assistant Examiner*—K. Shin
*Attorney, Agent, or Firm*—Brinks Hofer Gilson & Lione

[57] ABSTRACT

A battery charger control system and method for maximizing output power to a battery. This is achieved by ensuring operation at either the maximum allowable input current or the thermal limit imposed by the battery charger using an on-line controller. In the invention, the thermal limit is determined by the junction temperatures of the two main IGBT's. Because direct measurement of these temperatures is impractical, they must be calculated by a computer algorithm that uses various on-line measurements. Test results for a 8 kW battery charger indicate reduction in the bulk charging time from conventional battery chargers of about 26% when charging a set of NiFe batteries.

11 Claims, 5 Drawing Sheets

FIG. 1

BATTERY CHARGER CONTROL SYSTEM

BACKGROUND OF THE INVENTION

1. Field of the Invention

The invention relates in general to battery chargers, and in particular to a battery charger control system and method for maximizing the charging current to a battery.

2. Related Art

In a conventional battery charger with power factor correction (PFC), the input power is limited to the lowest AC voltage, $V_s$, multiplied by the maximum allowable line current. These chargers also typically hold the battery current constant over a wide range of battery voltages. Since the power draw increases as the battery voltage rises with this type of control, the battery current must be limited so the line current limit is not exceeded over the ranges of line and battery voltages.

The AC current that the charger draws is limited because the charger will be operating from a standard AC service. For example, this limit on the input current, $I_s$, may be 32A RMS (80% of a 40A circuit), thereby imposing an upper limit on the power that can be processed and the battery current. If output current is the regulated quantity, the current limit is determined by the lowest AC input voltage and the maximum battery voltage, $V_B$.

For the case where, pf=1.0, efficiency=100%, $V_s$=208 V.rms±10%, $V_B$=320 V.dc ±20%, the maximum battery current, $I_B$, will be, $$I_B = \frac{P_{OUT}}{V_{Bmax}} = \frac{P_{IN}}{V_{Bmax}} = \frac{V_{Smin}I_{Smax}pf}{V_{Bmax}}$$

$$I_B = \frac{(187)(32)(1)}{384} = \frac{5984}{384} = 15.58\, A.dc\; @\; 5984\, W.$$

Therefore, $I_B$ must be limited to 15.58 A.dc to limit $I_s$ to 32 A.rms for the worst case condition. However, when $V_B$ is at its minimum value, $$P_{OUT}=P_{IN}=I_B V_{BMIN}=(15.58)(256)=3988\, W.$$

Thus, as $V_B$, varies, the charger power will vary from 3988 W. To 5984 W.

However, if $I_s$ is held constant at 32 A.rms under all conditions, the power range will be, $$P_{MIN}=V_{SMIN}I_s pf=(187)(32)(1)=5984\, W.$$

$$P_{MAX}=V_{SMAX}I_s pf=(229)(32)(1)=7328\, W.$$

Thus, $Ps_{MIN}$ increases by approximately 50% and $P_{max}$ increases by approximately 22%, which greatly decreases the charging time.

It can be seen that the conventional charger cannot take advantage of favorable operating conditions, namely higher AC line voltages and low battery voltages, to increase the charging current. With the increasing interest in electric vehicles, efficient on board charging equipment that will operate from a standard household service is needed. The charger should maximize the power flow to the batteries under all conditions in order to reduce the charging time. The input AC voltage can range from 187V (low line) to 229V (high line), and the power that can be transferred to the battery is restricted by the AC line current limit.

Another factor that may limit the power level is the internal junction temperature, $T_J$ of the power semiconductor switching devices. These devices must be selected so that their $T_J$ limits are not exceeded at maximum power and ambient temperature, $T_A$. If these worst case conditions occur only infrequently, these devices will be underutilized for the vast majority of their operating conditions. It would be much more cost effective to use smaller devices, and lower the power level to limit $T_J$ during extreme worst case conditions. It is impractical to measure $T_J$ directly, but the invention describes a system that can calculate $T_J$ using a microcontroller. Thus, the two types of variables that limit the power level are $I_S$ and $T_J$.

The maximum power transfer system and method of the invention has been developed to improve this underutilization of the charger. By continually monitoring a set of five voltages and currents in addition to the heat sink temperature, the charger can increase the battery current until either the line current or internal junction temperature of one of the power semiconductors is at its maximum limit. This provides the maximum possible transfer of power to the battery.

SUMMARY OF THE INVENTION

In view of the foregoing, it is an object of the invention to reduce the charging time by providing a maximum power transfer method for maximizing the charging current to the batteries without exceeding the upper limit on the input current to the batteries and the junction temperatures of the power processing components. It is another object to provide a two stage battery charger with a controller for providing maximum output power and low input current distortion.

The battery charger control system includes a filter/rectifier connected to an input current source for converting alternating current to direct current, a boost stage connected to the filter/rectifier for providing a power factor correction circuit for the battery charger, a buck stage connected to the boost stage for providing output current control for the battery charger, and a controller connected to the boost and buck stages for determining operating conditions of the boost and buck stages of the battery charger. The controller maximizes the output power of the battery charger by controlling the charging current to the battery based the operating conditions of the boost and buck stages of the battery charger.

To achieve these and other objects, the maximum power transfer method includes the steps of:

(1) measuring an input current of the battery charger;

(2) determining whether the input current is greater than a maximum input current, and if so, decreasing a reference battery current of the battery charger and returning to step (1);

(3) measuring an input and output voltage of a boost stage of the battery charger, a battery voltage, a battery current and a heat sink temperature of the battery charger;

(4) determining a junction temperature of the boost stage;

(5) determining whether the junction temperature of the boost stage is greater than a maximum junction temperature of the boost stage, and if so, decreasing the reference battery current of the battery charger and returning to step (1);

(6) determining a junction temperature of a buck stage of the battery charger;

(7) determining whether the junction temperature of the buck stage is greater than a maximum junction temperature of the buck stage, and if so, decreasing the reference battery current of the battery charger and returning to step (1);

(8) increasing the reference battery current when the input current is less than the maximum input current, the junction temperature of the boost stage is less than the maximum junction temperature of the boost stage, and the junction temperature of the buck stage is less than the maximum junction temperature of the buck stage; and (9) returning to step (1).

The battery charger control system was constructed and tests were conducted on a nickel-iron battery pack to study the performance of the battery charger control system over a wide range of conditions. Reductions of approximately 26% below the charging time of the conventional charger were measured over a range of AC line voltages.

These and other aspects and advantages of the invention are described or apparent from the following detailed description of the preferred embodiments and appended drawings wherein like reference numbers refer to the same element, feature or component.

BRIEF DESCRIPTION OF THE DRAWINGS

The preferred embodiments are described with reference to the drawings in which.

DETAILED DESCRIPTION OF THE PREFERRED EMBODIMENTS

I. Introduction

Because of their limited energy capacity, electric vehicle (EV) batteries need frequent recharge, and it is usually desirable to do this as rapidly as possible. Broadly speaking, the charging process can be divided into two periods referred to as the bulk charge and the trickle charge. As these terms would indicate, the vast majority of the energy transfer occurs during the high current bulk charge, and the battery is then "topped-off" during the low current trickle charge. Because the trickle charge is restricted to relatively low battery currents, the ability to reduce the charging time depends on delivering as much current as possible during the bulk charging period. This strategy is the same for all commonly used batteries, even though the various types have very different charging profile specifications.

The parameters that ultimately limit the bulk charging current are, 1) the current capacity of the alternating current (ac) source 2) the thermal limitations of the charger and, 3) the thermal and chemical limitations of the battery.

For a typical portable or on board charger the initial bulk charge current will be limited only by parameters 1) and/or 2) because the limit imposed by parameter 3) is well above the capacity for this type of battery charger. As the battery voltage increases, parameter 3) will ultimately limit the process in order to avoid overheating and/or venting excessive gas from the battery.

On board battery chargers must operate over a wide range of ac input voltages, direct current (dc) battery voltages, and ambient temperatures. If the battery current is set at a fixed level that provides safe operation for the worst case combination of these conditions, the battery charger is operating under capacity whenever conditions are better than the worst case, thereby causing a considerable increase in the charging time. By using a set of on-line measurements and calculations, the battery charger control system of the invention always allows the battery charger to run as close as possible to its maximum possible power level. The battery charger control system can be controlled by the same microcontroller that would normally be used to monitor and control other functions of the battery charger, so the additional cost is minimal.

Figure 1:
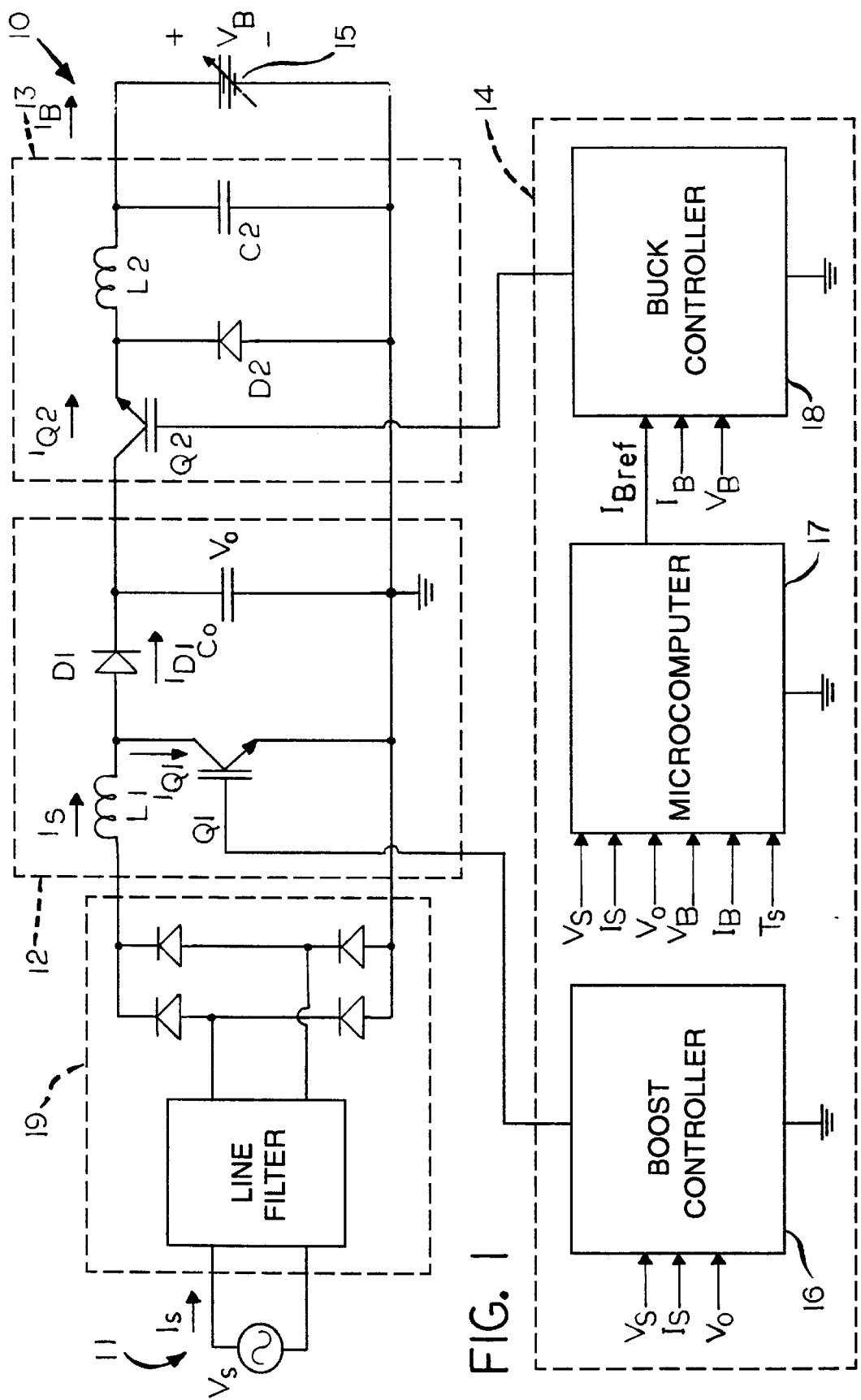
FIG. 1 shows a schematic of the battery charger with adaptive control for maximizing output power according a preferred embodiment of the invention.

FIG. 1 shows a battery charger control system 10 including a current source 11, a filter/rectifier 19, a boost stage 12, a buck stage 13 and a controller 14 for providing maximum transfer of power to a battery or battery pack 15 according to a preferred embodiment of the invention. The current source 11 provides an input current, $I_S$, to the battery charger control system 10 (hereinafter called "battery charger" or "charger"). For 208 or 240 Vac operation, the rectifier output voltage is too low for a typical EV battery in the range of 400 Vdc, so the boost stage 12 is necessary. The filter/rectifier 19 is connected to the current source 11. The boost stage 12 is connected to the filter/rectifier 19 and also provides the necessary power factor correction (PFC) circuitry. The boost stage 12 includes an inductor, $L_1$, connected to the filter/rectifier 19, a semiconductor switching device Q1, preferably an IGBT or a BJT, connected to the inductor, $L_1$, a diode, D1, connected to the inductor, $L_1$, and a capacitor, Co, connected across Q1 and the diode, D1.

The buck stage 13 is connected to the boost stage 12 and provides short circuit protection of the battery charger 10 and current controlled charging over a wide range of battery voltages. The buck stage 13 includes a semiconductor switching device Q2, preferably an IGBT or a BJT, connected to the boost stage 12, a diode, D2, connected to Q2, a inductor, $L_2$, connected to Q2 and a capacitor, C2, connected across the diode, D2, and the inductor, $L_2$.

The controller 14 is connected to the boost and buck stages 12, 13 and determines operating conditions of the boost and buck stages 12, 13. This is accomplished by using a combination of on-line measurements and stored off-line data to determine the input current and junction temperatures of Q1 and Q2 as described below. Specifically, the controller 14 includes a boost controller section 16 a microcomputer or microprocessor 17 and a buck controller section 18.

The boost controller section 16 is connected to Q1 and receives on-line measurements of $V_S$, $I_S$ and $V_O$. The microcomputer 17 receives on-line measurements of $V_S$, $I_S$, $V_O$, $V_B$, $I_B$ and $T_S$. The buck controller section 18 receives the reference battery current, $I_{Bref}$ determined by microcomputer 17 and on-line measurements of $I_B$ and $V_B$. Because of its modulated waveform, the Q1 calculations are much more complex than those for Q2. As discussed below, a series of tests were conducted to evaluate the Q1 and Q2 calculations and indicate agreement to within approximately 4% between the calculated and measured junction temperatures of Q1 and Q2.

Nomenclature As used herein, the acronyms have the following meaning:

$a_1, b_1, a_2, b_2,$ =coefficients for switching loss equations $D_Q(tk)$=IGBT duty ratio over switching interval k $E_{ON}$=measured IGBT turn-on switching loss, J $E_{OFF}$=measured turn-off switching loss, J $f_1, f_2$=switching frequency of Q1 and Q2, Hz $f_0$=ac input frequency, Hz $I_B$=average battery current, Adc $I_{ON}$=ideal instantaneous current of IGBT at turn-on, A $I_{ONk}$=idealized turn-on current for switching interval k $I_{OFF}$=ideal instantaneous current of IGBT at turn-off, A $I_{OFFk}$=idealized turn-off current for switching interval k $I_{QAVG}$=average IGBT current, A $I_{QRMS}$=rms IGBT current, Arms $I_S$=rms input current, Arms n=integer defined by Equation (4) below $P_D$=total actual IGBT dissipation, W $P_Q$=total calculated IGBT dissipation, W $P_{QCON}$=calculated IGBT conduction loss, W $P_{QSW}$=calculated IGBT switching loss, W $R_f$=equivalent resistance of saturated IGBT, Ω

$T_A$=ambient temperature, °C.

$T_J$=IGBT junction temperature, °C.

$T_O$=period of line (modulating) frequency $T_S$=heat sink temperature, °C.

$T_1, T_2$=period of the switching frequencies for Q1 and Q2

$T_2$=period of switching frequency of Q2, s $V_{FO}$, =dc portion of IGBT saturation voltage, V $V_B$=dc battery voltage, V $V_O$=dc output voltage of PFC, Vdc $V_S$=rms input voltage of PFC, Vrms $\theta_{JS}$=junction to heat sink thermal resistance, °C/W $\theta_{SA}$=heat sink to ambient thermal resistance, °C/W II. Principles of Operation As stated earlier, an object of the invention is to minimize the charging time by maximizing the bulk charging battery current, $I_B$, for the prevailing operating conditions. Again, it is assumed that the battery or battery pack 15 does not limit $I_B$ during the bulk charging period. This means that $I_B$ is initially limited only to protect the charger 10 and to limit the input current, $I_S$, to its rated value. To provide rapid protection from open and short circuits at the output, the buck stage 13 also employs conventional analog voltage and current feedback loops to set absolute limits on $V_B$ and $I_B$. In the normal steady state mode, the microcontroller 17 regulates $I_B$ simply by changing its reference signal $I_{BREF}$.

The parameters that ultimately limit the power to the battery 15 are:

1) Maximum allowable rms value of $I_S$, $I_{SMAX}$.

2) Maximum allowable junction temperature for Q1 or Q2, $T_{JMAX}$. Usually $I_S$ is the limiting factor, and it could be regulated either with an analog or a microcontroller control loop. For many types of loads the response of the controller loop would not be fast enough for this task, but it appears to be quite satisfactory for the slowly varying, monotonic load presented by the battery 15. When the junction temperatures, $T_{JQ1}$ and/or $T_{JQ2}$, of Q1 and Q2 become the limiting factor, the controller 14 becomes essential for determining these junction temperatures from on-line measurements. It should be appreciated that the variations in $T_{JQ1}$ and $T_{JQ2}$ also are slow enough so that the microcontroller 17 response time provides adequate protection.

Of course, the battery charger 10 can be designed so that the junction temperatures, $T_{JQ1}$ and $T_{JQ2}$, will always remain below a maximum junction temperature, $T_{JMAX}$, under all conditions. However, this design consideration can impose a serious cost penalty because the IGBTs and the heat transfer system will have to be designed for the absolute worst case condition that usually occurs in only a very small percentage of applications.

The independent input variables that ultimately determine the junction temperatures, $T_{JQ1}$ and $T_{JQ2}$, are the input voltage, $V_s$, the battery voltage, $V_B$ and the heat sink temperature, $T_S$. All three of these variables are subject to wide variations, but they can be measured directly along with other measured variables. In this manner, the battery charger control system 10 can be implemented from the measured values of $V_s$, $I_s$, $T_s$, $V_o$, $V_B$ and $I_B$.

To protect the battery charger control system 10, the analog control loops must always limit $I_B$ below some absolute $I_{BMAX}$, but it is usually necessary to reduce $I_B$ even further so that $I_s$, $T_{J1}$ and $T_{J2}$ remain below their respective maximum limits. This is illustrated by the following example where $I_s$ is the limiting factor.

EXAMPLE

Assume that the limiting factor is $I_s$ instead of $T_{JQ1}$ or $T_{JQ2}$, that is, $T_{JQ1}$ and $T_{JQ2}$ are less than $T_{JMAX}$ when $I_s=I_{SMAX}$. Also, assume the input power factor=1.0 and the efficiency=95%.

Specifications: $V_S$=187 (90% of 208) to 264 (110% of 240) Vrms.

$I_{SMX}$=Arms. (80% of the rating for a 40A service as required by Underwriter's Laboratories®)

$V_B$=324±60 V$dc$.

Case 1

Assume $V_{S1}$=187 Vrms, $V_B$=384 Vdc and that $I_{B1}$ is limited so that $I_{S1}=I_{SMAX}$=32 Arms, Input power=$P_{S1}$=(187)(32)=5984 W, Battery power=$P_{B1}$=(0.95)($P_{S1}$)=(384)($I_{B1}$)=5685 W, or $I_{B1}$=14.8 Adc.

Therefore, $I_B$ must be limited to 14.8 Adc to avoid exceeding $I_{SMAX}$=32 Arms for this worst case condition. However, if this value of $I_B$ is used for all conditions, it places a serious penalty on all other cases, as will be shown below.

Case 2

Assume $I_B$ is limited to the 14.8 Adc value found in Case 1, but now $V_S$=264 Vrms and $V_B$=264 Vdc.

Battery power=$P_{B2}$=264×w14.8=3907 W,

Input power=$P_{S2}$=(264) ($I_{S2}$)=$P_{S2}$/0.95=4113 W, $I_{S2}$32 4113/264=15.6 Arms.

In this case, the battery charger only delivers 49% of the available source power of (32)(264)=8448 W.

Case 3

Instead of limiting $I_B$ to 14.8 Adc as in Cases 1 and 2, $I_B$ is allowed to vary in order to hold $I_S=I_{SMAX}$ =32 Arms over the entire range of $V_S$ and $V_B$. As the battery charges, $I_S$ will be held constant at 32 Arms by decreasing $I_B$ as $V_B$ increases. As in Case 2, if we assume the maximum $V_S$ of 264 Vrms, $P_{S3}=(264)(32)=8488$ W=constant, $P_{B3}=(V_{B3})(I_{B3})=(0.95)(P_{S3})=8064$ W=constant.

Figure 2:
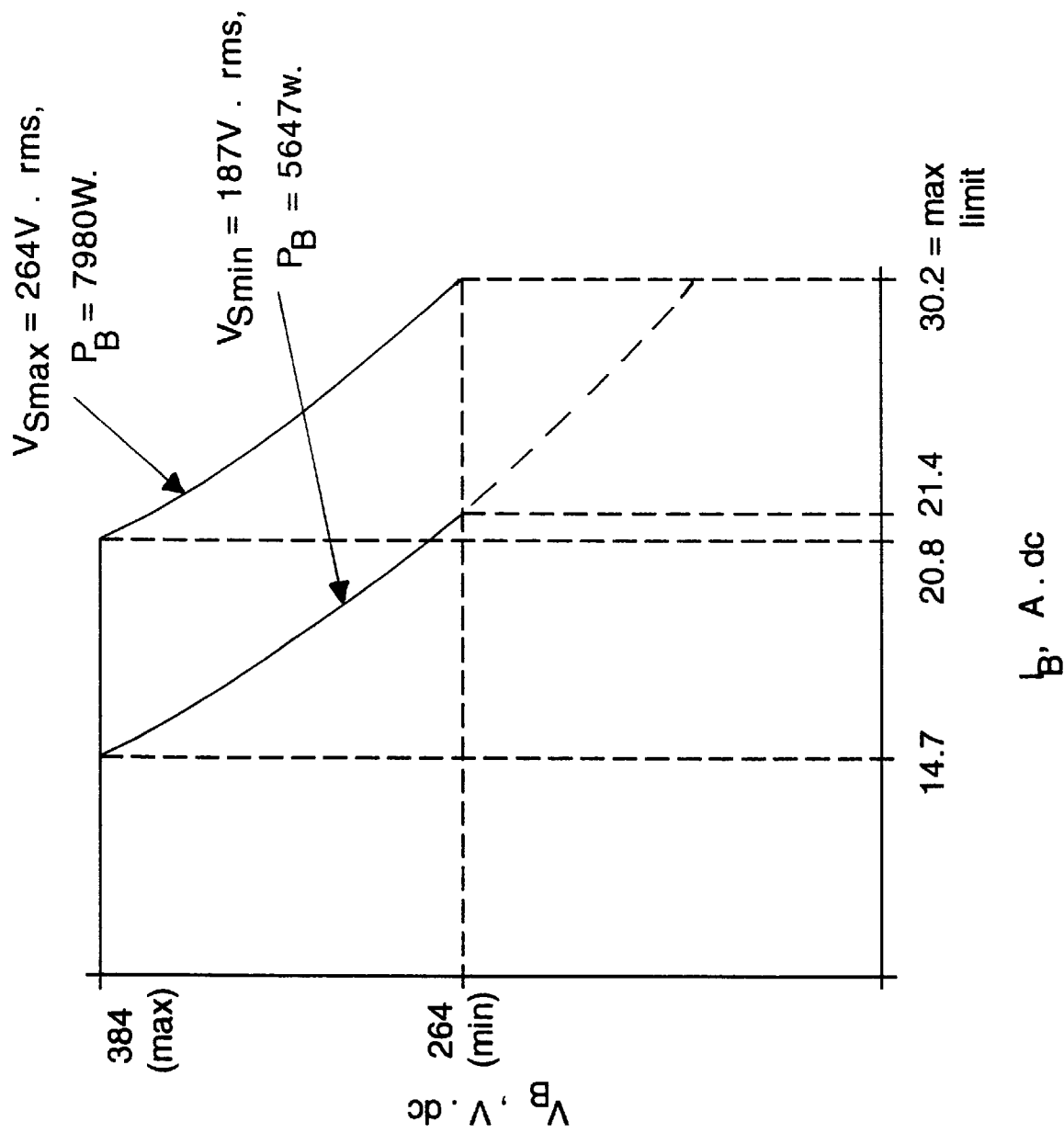
FIG. 2 shows a graph of battery current vs. battery voltage maximum power transfer profiles for minimum and maximum voltages of the power factor correction circuit.

The charger now delivers the full 8064 W. of available power, and it continues to do so until the battery reaches its maximum voltage of 384 Vdc. The $V_B$ vs. $I_B$ maximum power transfer profiles for $V_{SMIN}$ and $V_{SMAX}$ are shown in FIG. 2.

Similar results occur when $T_{JQ1}$ or $T_{JQ2}$ become the limiting factor and $I_B$ is regulated to control these temperatures instead of $I_S$.

III. Loss Calculation for Q1 and Q2

In those instances where either junction temperatures, $T_{JQ1}$ or $T_{JQ2}$, become the limiting factor, it will be necessary to decrease the load until both $T_{JQ1}$ and $T_{JQ1}<T_{JMAX}$. However, it should be noted that $T_{JQ1}$ and $T_{JQ2}$ cannot be measured directly, so they must be determined from on-line measurements. It also should be noted that the common technique of simply limiting the heat sink temperature, $T_S$, will be inadequate if maximum power transfer is desired. This is because the maximum allowable $T_S$ must actually drop as the ambient temperature, $T_A$, drops in order to avoid an excessive $T_J$. This can be illustrated by the following example for a single device on a dedicated heat sink with dissipation, $P_D$, given by the following expressions:

$$T_J=(P_D\theta_{JS})=T_S \qquad (1)$$

$$T_S=(P_D\theta_{SA})=T_A \qquad (2)$$

Suppose $\theta_{JS}=0.2°$ C./W, $\theta_{SA}=0.18°$ C./W and $T_{JMAX}=125°$ C. At $T_A=49°$ C., $T_{JMAX}=125°$ C. will allow a $P_D=200$ W that corresponds to $T_S=85°$ C. However, at $T_A=40°$ C., $T_{JMAX}=125°$ C. will allow a $P_D=434$ W, but this also means that $T_S$ must not exceed 38° C. If $T_S$ was allowed to reach 85° C. at $T_A=-40°$ C., this would mean $P_D=694$ W and $T_J=224°$ C.

The above example indicates that 117% more power can be dissipated at the lower $T_A$, but only if $T_S$ decreases by 47° C. when $T_A$ decreases by 89° C. This maximum power transfer can be achieved only if $T_S$ is measured and $P_D$ is found from the values for the conduction and switching losses of Q1 and Q2 determined by the controller. The determination of these losses is considered in the following sections. All terms are defined in the Nomenclature section given above. However, it is noted that the "1" and "2" subscripts for Q1 and Q2 may be omitted for brevity.

Q1 Loss Calculations

Figure 3:
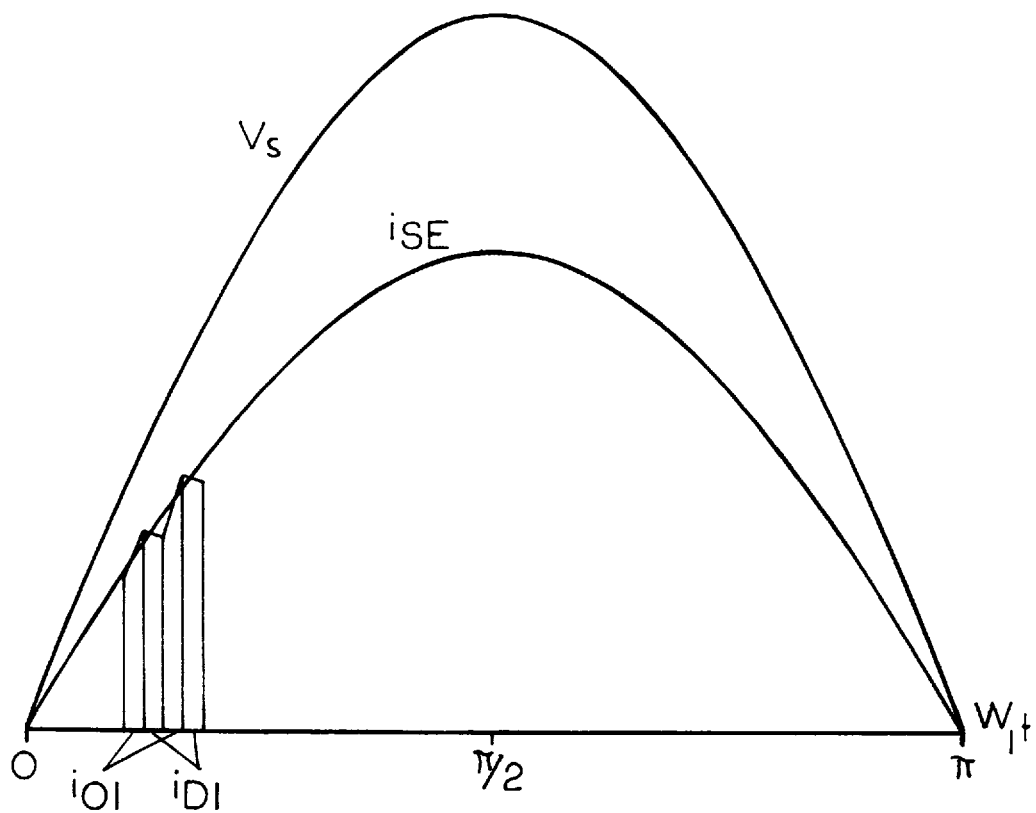
FIG. 3 shows a graph of the input voltage, $V_S$, the 60 Hz envelope of the input current, $i_S$ ($i_{SE}$), and exaggerated versions of typical $i_{D1}$ and $i_{Q1}$ pulses.

The simplified schematic for the boost stage 12 of the battery charger is shown in FIG. 1. FIG. 3 shows input voltage, $V_s$, the 60 Hz envelope of the instantaneous current, $i_S$ ($i_{SE}$), and exaggerated versions of typical $i_{D1}$ and $i_{q1}$ pulses. The actual $i_{D1}$ and $i_{Q1}$ pulses are much narrower than those shown since $i_{D1}$ and $i_{Q1}$ typically switch at about 20 kHz, whereas $V_s$ is at 60 Hz. The $i_{SE}$ envelope is the locus of the averaged value of the $i_{D1}$ and $i_{Q1}$ pulses. This is the ideal shape of the input current, $i_S$, ahead of the line filter.

To derive these equations, we assume that $f_1 >> f_0$ and that the two frequencies are synchronized. However, the accuracy of the calculation is virtually unaffected if the frequencies are asynchronous.

Q1 Conduction Loss

The average value of $i_Q$ is the same as the average of $i_{QE}$ or, $$I_{QAVG}=I_s\left(\frac{2\sqrt{2}}{\pi}-\frac{V_s}{V_o}\right) \qquad (3)$$

To find the RMS value of $i_Q$, we assume the $f_s$ and $f_0$ are synchronized and, $$n=\frac{T_o}{4T_1}-1\ (n=\text{integer}) \qquad (4)$$

Because the duty ratio of $i_Q$, $D_Q(t)$, is $$D_Q(t)=1-D_D(t)$$

we have, $$D_{Q(tk)}=\frac{\sqrt{2}\ V_o\sin\omega_o t_k+V_s(\cos 2\omega_o t_k-1)}{\sqrt{2}\ V_o\sin\omega_o t_k} \qquad (5)$$

where, $t_k=kT_1+T_1/2$, $\omega_o=2\pi/T_o$, and k=number of switching interval, $0\leq k\leq N$.

Because $i_Q$ can be approximated by a series of rectangular pulses, each with an amplitude equal to that of $i_{SEk}$, we have, $$I_{QRMS}=2I_s\sqrt{\frac{2T_1}{T_o}\left[\sum_{k=0}^{n}D_Q t_k\sin^2(\omega_o t_k)\right]^{1/2}} \qquad (6)$$

If Q1 or Q2 is a bipolar junction transistor (BJT) or an insulated gate bipolar transistor (IGBT), then its saturation characteristic can be approximated by plotting a straight line of $I_F$ with respect to $V_F$ with a slope of $R_F$. Therefore, the conduction losses can be calculated from the following:

$$P_{CON}=(V_{FO1})(I_{QAVG})=(R_{F1})I_{QRMS}^2 \qquad (7)$$

Q1 Switching Loss

Because $i_{SE}$, $V_s$, $D_Q$ and $D_D$ are changing very slowly with respect to $T_S$ in FIG. 3, it is reasonable to assume all these variables remain constant at the mid-point value of interval k. Therefore, for Q1, $$\Delta I_{QPPk}=\frac{T_s D_Q(t_k)\sqrt{2}\ V_s\sin(\omega_o t_k)}{L} \qquad (8)$$

where, $$t_k=kT_1+\frac{T_1}{2},\ \omega_o=2\pi/T_o$$

Therefore, $$I_{ONk}=\sqrt{2}\ I_s\sin(\omega_o t_k)-\frac{\Delta 1_{QPPk}}{2} \qquad (9)$$

$$I_{OFFk}=\sqrt{2}\ I_s\sin(\omega_o t_k)+\frac{\Delta I_{QPPk}}{2} \qquad (10)$$

The above values can be used to find the turn-on energy loss, $E_{QSONk}$, and the turn-off energy loss, $E_{QSOFFk}$. If this is done over ¼ of a cycle of $f_o$, the total power switching loss, $P_{SW}$, is given by, $$P_{SW}=\frac{4}{T_o}\sum_{k=o}^{n}(E_{ONk}+E_{OFFk}) \qquad (11)$$

where $E_{onk}$ and $E_{offk}$, are found from experimental log-log plots and can be described by, $$E_{on}=10^{(a1\ log Ion-b1)} \qquad (12)$$

$$E_{off} = 10^{(a2\ log Ioff - b2)} \quad (13)$$

where $a_1$, $b_1$, and $a_2$, $b_2$ are measured coefficients as described below.

01 Junction Temperature

The total calculated $Q_1$ losses are, $$P_{Q1} = P_{CON} + P_{SW} \quad (14)$$

The junction temperature, $T_{QJ1}$, is found from Equation (1) by substituting $P_{Q1}$ in place of $P_D$.

Q2 Loss Calculations

Conduction Losses for Q2

The simplified schematic for the buck stage 13 of the battery charger 10 is also shown in FIG. 1. The procedure for finding the conduction loss for Q2 has some similarity to Q1, but is much simpler since the current is not modulated by $f_0$.

Because the inductor L2 flux linkages when Q2 is turned on must equal those when Q2 is turned off, we have $$(V_o - V_B)T_2 D = V_B(1-D)T_2 \quad (15)$$

where, $$D = \text{duty ratio} = \frac{V_b}{V_o}, \text{ and } T_2 = \text{period of } Q_2 \quad (16)$$

The incremental change in the battery current, $I_B$, for each cycle is given by, $$\Delta I_B = \frac{(V_o - V_B)DT_2}{L_2} \quad (17)$$

It should be noted that because the battery voltage, $V_B$, can be modeled as an ideal voltage source, the battery current, $I_B$, is analytically indeterminate and must be measured. The instantaneous value of the battery current, $i_B$, when Q2 turns on is given by the following expression:

$$I_{ON} = I_B - \frac{\Delta I_B}{2} \quad (18)$$

the instantaneous value at turn-off is given by, $$I_{OFF} = I_B + \frac{\Delta I_B}{2} \quad (19)$$

The average value of $i_{Q2}$ is given by, $$I_{QAVG} = DI_B \quad (20)$$

And the rms value is given by, $$I_{QRMS} = \left[ \frac{1}{T_2} \int_o^{DT_2} \left( I_{ON} + \frac{\Delta I_B}{DT_2} t \right)^2 dt \right]^{1/2} \quad (21)$$

Therefore, $$I_{QRMS} = \left[ D \left( I_{on}^2 + I_{on} \cdot \Delta I_B + \frac{(\Delta I_B)^2}{3} \right) \right]^{1/2} \quad (22)$$

As for Q1, the conduction losses for Q2 are given by, $$P_{CON} = V_{FO2} I_{QAVG} = R_{F2} I_{QRMS}^2 \quad (23)$$

Switching Losses for Q2

To find the switching loss, $E_{ON}$ and $E_{OFF}$ can be found from off-line measurements for Q2 that are expressed in the same form as Equations (12) and (13). The switching loss is then, $$P_{SW} = f_2(E_{ON} = E_{OFF}) \quad (24)$$

The total calculated Q losses are then, $$P_{Q2} = P_{CON} = P_{SW} \quad (25)$$

and the junction temperature, $T_{JQ2}$, is found from Equation (1) by substituting $P_{Q2}$ in place of $P_D$.

Battery Charger Control Method

Figure 4:
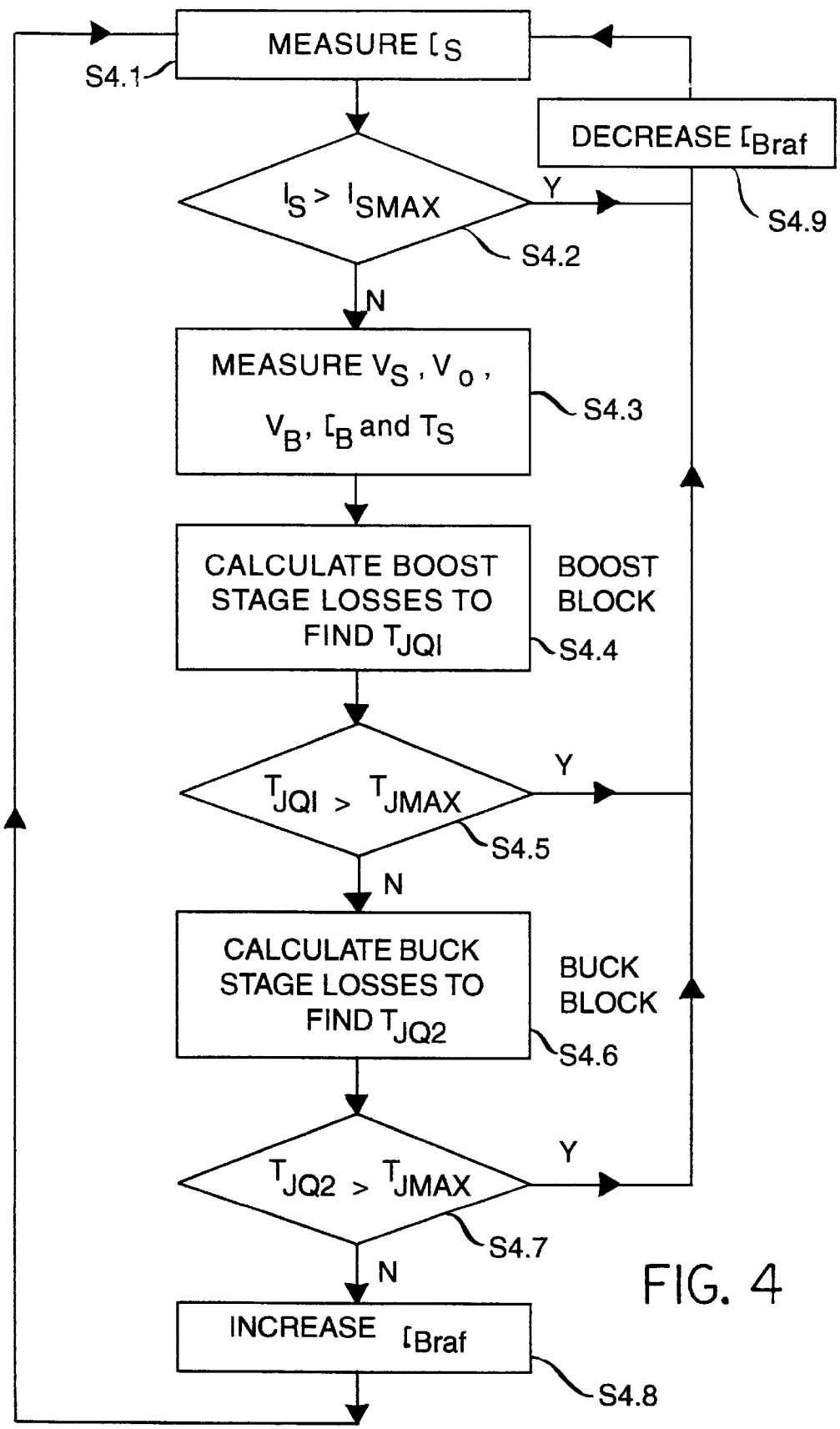
FIG. 4 shows a flowchart for an on-line battery charging control method according to the invention.

FIG. 4 shows a flow chart of the preferred method for controlling the power during the bulk charging period. In the preferred method, the controller 14 uses the off-line measured data ($a_1$, $b_1$ in Equation (12), and $a_2$ in Equation (13), the on-line measurements of $I_s$, $V_s$, $V_o$, $V_B$ and $T_s$, to determine the junction temperatures, $T_{JQ1}$ and $T_{JQ2}$. The battery charger control system 10 also includes analog control loops for limiting the absolute maximum values of $V_B$ and $I_B$.

As shown in FIG. 4, the preferred method begins by measuring the input current, $I_S$ (Step S4.1). Next, a determination is made whether the input current, $I_S$, is greater than a maximum input current, $I_{SMAX}$ (Step S4.2). If the input current, $I_S$, is greater than the maximum input current, $I_{BMAX}$, then the method proceeds to Step S4.9 and decreases the reference battery current, $I_{bref}$ and then returns to Step S4.1. If the input current, $I_S$, is not greater than the maximum input current, $I_{SMAX}$, then the input voltage, $V_S$, the output voltage, $V_O$, the battery voltage, $V_B$, the average battery current, $I_B$, and the heat sink temperature, $T_S$, are measured (Step S4.3).

Next, the boost stage losses are calculated to determine the IGBT junction temperature at $T_{JQ1}$ (Step S4.4). Then, the method determines whether the IGBT junction temperature, $T_{JQ1}$, is greater than a maximum IGBT junction temperature, $T_{JMAX}$ (Step S4.5). If the IGBT junction temperature, $T_{JQ1}$, is greater than a maximum IGBT junction temperature, $T_{JMAX}$, then the method proceeds to Step S4.9 and decreases the reference battery current, $I_{bref}$, and then returns to Step S4.1. If in Step S4.5 the IGBT junction temperature, $T_{JQ1}$, is not greater than a maximum IGBT junction temperature, $T_{JMAX}$, then the buck stage losses are calculated to determine the IGBT junction temperature of $T_{JQ2}$ (Step S4.6). Then, the method determines whether the IGBT junction temperature, $T_{JQ2}$, is greater than a maximum IGBT junction temperature, $T_{JMAX}$ (Step S4.7). If the IGBT junction temperature, $T_{JQ2}$, is greater than a maximum IGBT junction temperature, $T_{JMAX}$, then the method proceeds to Step S4.9 and decreases the reference battery current, $I_{bref}$, and then returns to Step S4.1. If in Step S4.7 the IGBT junction temperature, $T_{JQ2}$, is not greater than a maximum IGBT junction temperature, $T_{JMAX}$, then the reference battery current, $I_{Bref}$ is increased (Step S4.8). Then, the method returns to Step S4.1 to continue begin the next outer loop (Steps S4.1 - S4.8).

The cycle time required to complete the outer loop of the flow chart shown in FIG. 4 is not very critical because the battery load changes very slowly. In this case, the controller requires about 10 sec., but this appears to be more than adequate to prevent large variations in $T_{JQ1}$ or $T_{JQ2}$. However, such a lengthy cycle time would be unacceptable for a fast changing load. In these cases, it would probably be necessary to use approximations to speed up the flow chart method and/or use a faster controller.

In the illustrated embodiment, the controller 14 is implemented using a suitably programmed general purpose computer, e.g., a microprocessor, microcontroller or other processor device (CPU or MPU), such as a Motorola® MC68HC11K0 8-bit microcontroller with an internal clock rate of 3MHz, either alone or in conjunction with one or more peripheral (e.g., integrated circuit) data and signal processing devices. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented as a single special purpose integrated circuit (e.g., ASIC) having a main or central processor section for overall, system-level control, and separate sections dedicated to performing various different specific computations, functions and other processes under control of the central processor section. In general, any device or assembly of devices on which a finite state machine capable of implementing the flowchart shown in FIG. 4 can be used as the controller. As shown, a distributed processing architecture is preferred for maximum data/signal processing capability and speed.

IV. Test Results

Figure 5:
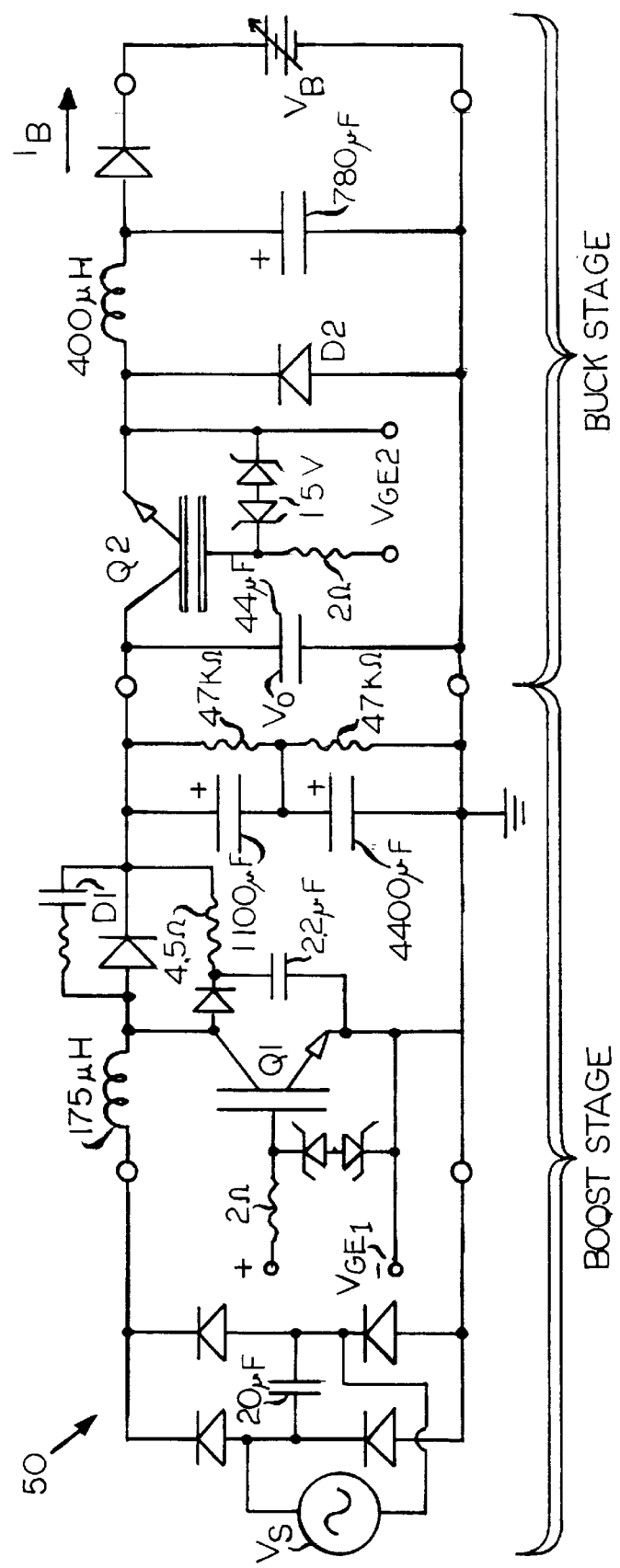
FIG. 5 shows a power circuit for an 8 kW battery charger according to the invention.

FIG. 5 shows the schematic of an 8 kW charger with the following specifications:

$V_s$=187 to 264 Vrms, $I_{smax}$=32 Arms, $V_B$=264 to 384 Vdc, $I_{Bmax}$=30.6 Adc, Power stage efficiency=95%, $P_{Bmax}$=8kW.

The battery charger control system 10 is controlled by controller 14 using the bulk charging equations described above. As indicated in FIG. 5, semiconductor devices Q1, D1, and Q2, D2, preferably IGBT's and diodes, respectively, were implemented in a dual module arrangement. This arrangement was chosen for packaging convenience and to reduce switching transients, even though the other half of the module was not utilized.

Test circuits similar to the boost and buck power stages in FIG. 5 were used to measure the switching losses of Q1 and Q2 at various current levels. The circuits use the same conditions as those in FIG. 5 in order to reproduce the same switching transitions. The measurements were performed at an extremely low duty ratio so that the junction temperatures, $T_J$, of Q and D were equal to the heat sink temperature, $T_S$. The heat sink temperature, $T_S$, equal to each junction temperature, $T_J$, was then held at 105° C. which is 70% of the 150° C. limit for the maximum junction temperature, $T_{JMAX}$. This temperature was then chosen for the maximum junction temperature, $T_{JMAX}$, for both $T_{JQ1}$ and $T_{JQ2}$. At values of $T_J$ below 105° C., the calculated losses will err on the high side because the stored 105° C. loss data parameters are higher than those for lower temperatures. However, this is acceptable because the calculations only need maximum accuracy at the specified $T_{JMAX}$=105° C.

Log-log plots of switching energy loss as a function of the "ideal" collector current at the switching point yield equations in the form of Equations (12) and (13) for the turn-on and turn-off switching energy losses as a function of collector current. It should be noted that the momentary collector current during turn-on is actually higher than the assumed load current because of the reverse recovery of the diode. Likewise the momentary $V_{CE}$ at turn-off is actually higher than $V_o$ because of the voltage transient caused by parasitic inductance. These effects are included in the measured loss data, but the reference current used in the equations is the calculated "ideal" current at the moment of switching. The switching loss equations determined from these measurements are as follows:

Q1:
$\log_{10}E_{On}$=0.945 $\log_{10}I_{ON}$−1.525
$\log_{10}E_{OFF}$=1.049$\log_{10}I_{OFF}$−0.985

Q2:
$\log_{10}E_{ON}$=0.668 $\log_{10}I_{ON}$−0.904
$\log_{10}E_{OFF}$=1.002 $\log_{10}I_{OFF}$−0.940 where,

E=energy loss, mJ, and

I=ideal instantaneous current, A.

As stated earlier, $V_O$ is not tightly regulated by the boost stage (PFC circuit), but the external measurements in Table I, infra, indicated that $V_O$, only drops by about 4% as $I_S$ increases from 12 Arms to 32 Arms. Because the variation is still rather small and optimum accuracy is only required near the maximum load and $T_J$, the preferred method only used switching loss data for $V_O$=415 Vdc and $T_J$=105° C. Because $V_O$ is the steady state off voltage for both Q1 and Q2, it is used as the reference voltage to determine the switching losses for both devices. Additional loss curves could be used if the losses were desired for other values of $V_O$.

In the preferred embodiment, manufacturer's data from Powerex, Inc. indicate the following forward conduction parameters and thermal resistance for Q1 and Q2 at a junction temperature $T_J$=105° C.:

$V_{FO}$=1.0 V., $R_F$=0.001Ω, $\theta_{JS}$=0.24° C./W.

As with switching losses, the conduction loss determinations will be optimum at the maximum junction temperature, $T_{JMAX}$, and less accurate at lower $T_J$ values. However, there is some compensation because $V_F$ decreases and Ran increases as $T_J$ increases. A series of tests were conducted to determine the accuracy of these loss calculations. The tests used the temperature rise of a dedicated heat sink to determine $T_{JQ1}$ at various power levels. The measured results were compared with the corresponding calculated losses. The evaluated cases indicate a very acceptable agreement with the largest deviation between the measured and calculated total loss for Q1 of approximately 4%.

In the preferred embodiment shown in FIG. 1, Q1 and Q2 are mounted on the same heat sink. However, separate heat sinks could also be used if both $T_{S1}$ and $T_{S2}$ are monitored. In either case, both $T_{JQ1}$ and $T_{JQ2}$ are readily determined using Equation (1).

To determine how the new control scheme might affect the actual charging time, two sets of tests were conducted using the battery charger 50 shown in FIG. 5. One test was based on Case 2 of the previous example, while the other test was based on Case 3. The input current, $I_S$, was still the limiting factor in these particular tests because neither junction temperature, $T_{JQ1}$ or $T_{JQ2}$, reached their maximum limit, $T_{JMAX}$, of 105° C. The strategy for each of these tests was to start charging from a specified state of charge (SSOC) and measure the time required to supply a certain amount of charge (amp-hours) or energy (kilowatt hours) to the battery. The supplied charge or energy should roughly correspond to the amount required to complete the bulk charge.

Although it is difficult to determine precisely when the bulk charge is complete, the following procedure is reasonable. The batteries used in these tests were a set of NiFe cells. When the cells approach a highly charged state, their ability to store additional energy decreases, and the excess energy begins to create excessive amounts of hydrogen. This is evidenced by a noticeable increase in the gas released from the electrolyte, which in this case occurred when $V_B$≡384 Vdc. Since the voltage limit on the charger also is set to 384 Vdc., the current begins to decrease when this voltage is reached, and the current rapidly becomes much lower than at the beginning of the bulk charging process. To establish the initial SSOC, the batteries were first charged in this manner and then discharged by 110 amp-hours. The open circuit voltage at the initial SSOC was approximately 315 Vdc, but this increased rapidly once charging began and rose to about 345 Vdc within 1 or 2 minutes. Results from the two sets of tests are listed below:

| Test | Energy | Charge | Charge Time |
|---|---|---|---|
| Data Set #1: $V_S$ = 255 Vrms Regulated $I_{BMAX}$ = 14.9 Adc. (Case 2) $P_{BMAX}$ = 5720 W. | | | |
| 1 | 44.3 | 118 | 8.6 |
| 2 | 45.7 | 123 | 8.8 |
| 3 | 48.4 | 130 | 9.3 |
| Avg. | 46.1 kWh | 123/7 Ah | 8.9 h |
| Data Set #2 $V_S$ = 255 Vrms, Regulated $I_{SMAX}$ = 32 Arms. (Case 3) $P_{BMAX}$ = 7750 W. | | | |
| 1 | 47.9 | 129 | 6.7 |
| 2 | 49.2 | 132 | 6.9 |
| 3 | 45.9 | 123 | 6.3 |
| Avg. | 47.7 kWh | 128 Ah | 6.6 h |

In this particular set of tests, Data Set #2 could only achieve about 7.75 kW, instead of the 8 kW maximum because $V_S$ was only 255 Vrms, instead of the maximum of 264 Vrms. However, 255 Vrms represents a somewhat more realistic maximum because it is only 106% of the nominal value of 240 Vrms. It should be noted that the battery voltage, $V_B$, tends to increase very rapidly early in the charging cycle and then increases at a very slow rate. This has the effect of decreasing the battery current, $I_B$, for Data Set #2, and thus decreasing the charging time. For example, when $V_B$=315 Vdc, the controller for Data Set #2 could supply 24.6 Adc, but it can supply only 20.2 Adc once the battery voltage, $V_B$, reaches 383 Vdc. Of course, Data Set #1 can supply its maximum $I_B$=14.9 Adc. over this entire $V_B$ range.

In spite of the factors discussed above, the controller used for Data Set #2 was able to supply the bulk charge in only about 6.6 hours as compared to about 8.9 hours for Data Set #1. This 26% improvement should be significant in many instances, especially when the available charge time is limited.

A series of tests also were performed to study the performance when the maximum junction temperature, $T_{JMAX}$, was the limiting factor instead of the maximum input current, $I_{JMAX}$. Since the $T_{JQ1}$ calculations are more complex than those for $T_{JQ2}$, the tests were based on operating the charger so that the calculated junction temperature, $T_{JQ1}$, is equal to the maximum junction temperature, $T_{JMAX}$, of 105° C. (70% of 150° C.). This was accomplished by removing the $T_S$ thermistor from the heat sink and heating it externally until the calculated $T_{JQ1}$ =105° C. If $T_S$ is increased further, the microcomputer 17 will reduce the reference battery current, $I_{BREF}$, in order to hold the calculated junction temperature, $T_{JQ1}$, equal to approximately 105° C.

The main purpose of these tests was to evaluate the accuracy of the $T_{JQ1}$ calculations in the presence of possible system measurement errors in $T_S$, $V_S$, $I_S$ and $V_O$. To provide a basis of comparison, externally measured values of $T_S$, $V_S$, $I_S$ and $V_O$ also were used in an off-line calculation of $T_{JQ1}$. The results of this test are shown in Table I.

TABLE I

On-Line and Off-line $T_{JQ1}$ calculations
$T_{JMAX} = 105°$ C.

| $I_S$ (Arms) | $V_S$ (Vrms) | $V_o$ (Vdc) | $T_S$ (°C.) | $T_{JQ1}$ (°C.) |
|---|---|---|---|---|
| External Measurements | | | Off-Line Calculations | |
| 32 | 220 | 414 | 75 | 106 |
| 24 | 220 | 420 | 80 | 105 |
| 19 | 220 | 425 | 85 | 105 |
| 12 | 220 | 431 | 90 | 105 |
| Internal Measurements | | | Off-Line Calculations | |
| 32 | 215 | 420 | 75 | 105 |
| 24 | 216 | 422 | 81 | 105 |
| 18 | 220 | 424 | 86 | 105 |
| 11 | 217 | 427 | 91 | 105 |

$T_S$ calibrated at 75° C.

All of the external measurements were measured with digital meters except the heat sink temperature, $T_S$, which was taken with an analog thermocouple meter in order to avoid electromagnetic interference (EMI) effects from the battery charger 50. All of the internal measurements were processed by the microcontroller's A/D converter (not shown) and then downloaded to a PC monitor (not shown).

V. Summary

Present EV batteries are characterized by limited energy storage, but they can tolerate bulk charging currents that are well above the capability of on board charging systems. Therefore, it becomes quite important to design the charger to deliver as much current as possible during the bulk charging period. For the battery charger control system and method of the invention, the only limiting factors were $I_S$, $T_{JQ1}$ and $T_{JQ2}$.

A controller was used to ensure that the battery charger control system always delivered the maximum possible power without exceeding any of these three limits. $I_S$ can be monitored directly, but $T_{JQ1}$ and $T_{JQ2}$ must be calculated using the controller.

Test data for the $I_S$ limiting case indicates a reduction in the bulk charging time of about 26% when used with NiFe batteries. This is considered to be a significant reduction, and this improvement is particularly important for those applications where charging time must be minimized. Test data using $T_{JQ1}$ as the limiting case indicates good agreement with off-line determinations, and the results do not appear to be overly sensitive to measurement errors.

While this invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made without departing from the spirit and scope of the invention as defined in the following claims.

What is claimed is:

1. A maximum power transfer method for using a battery charger to charge a battery, the method comprising the steps of:

(1) measuring an input current of the battery charger;
(2) determining whether the input current is greater than a maximum input current, and if so, decreasing a reference battery current of the battery charger and returning to step (1);
(3) measuring an input and output voltage of a boost stage of the battery charger, a battery voltage, a battery current and a heat sink temperature of the battery charger;

(4) determining a junction temperature of the boost stage;

(5) determining whether the junction temperature of the boost stage is greater than a maximum junction temperature of the boost stage, and if so, decreasing the reference battery current of the battery charger and returning to step (1);

(6) determining a junction temperature of a buck stage of the battery charger;

(7) determining whether the junction temperature of the buck stage is greater than a maximum junction temperature of the buck stage, and if so, decreasing the reference battery current of the battery charger and returning to step (1);

(8) increasing the reference battery current; and (9) returning to step (1).

2. The method according to claim 1, wherein the junction temperature of the boost stage is determined by on-line measurements of conduction and switching losses in the boost stage.

3. The method according to claim 1, wherein the junction temperature of the buck stage is determined by on-line measurements of conduction and switching losses in the buck stage.

4. A battery charger for maximizing charging current to a battery, comprising:

a filter/rectifier for converting an input current from alternating current to direct current for said batter charger;

a boost stage connected to said filter/rectifier for providing a power factor correction circuit of said battery charger;

a buck stage connected to said boost stage for providing output current control of said battery charger; and a controller connected to at least one of said boost and buck stages for determining at least one of a junction temperature of said boost and buck stages of said battery charger.

5. The battery charger according to claim 4, wherein said boost stage comprises an inductor connected to said current source, a semiconductor switching device connected to the inductor, a diode connected to the inductor and a capacitor connected across the semiconductor switching device and to the diode.

6. The battery charger according to claim 4, wherein, said buck stage comprises an semiconductor switching device connected to said boost stage, a diode connected to the semiconductor switching device, a inductor connected to the semiconductor switching device and a capacitor connected across the diode and the inductor.

7. The battery charger according to claim 4, wherein the junction temperatures of said boost and buck stages are determined by measuring at least one of the input current to said battery charger, an input and output voltage of said boost stage, a battery voltage, an average battery current and a heat sink temperature of said battery charger.

8. A method for controlling output power of a battery charger, comprising the steps of:

(1) determining operating conditions of at least one stage of a battery charger be determining whether a junction temperature of at least one of a boost stage and a buck stage of the battery charger is greater than a maximum junction temperature of a respective boost stage and buck stage; and (2) controlling the output power of the battery charger by maximizing an input current based on the operating conditions determined in step (1).

9. The method of claim 8, wherein the operating conditions of step (1) comprise a junction temperature of a boost stage and a junction temperature of a buck stage of the battery charger.

10. The method of claim 9, wherein the junction temperatures are determined by on-line measurements of an input and output voltage of the boost stage and a battery voltage, a battery current and a heat sink temperature of the battery charger.

11. The method of claim 8, wherein the output power is maximized by determining whether the input current is greater than a maximum input current, and if so, decreasing a reference battery current of the battery charger.

\* \* \* \* \*